Patented Feb. 2, 1937

2,069,473

UNITED STATES PATENT OFFICE 2,069,473

NITROGENOUS CONDENSATION PRODUCTS

Friedrich Ebel, Mannheim, Germany, assignor to General Aniline Works, Inc., New York, N. Y., a corporation of Delaware No Drawing. Application October 6, 1934, Serial No. 747,246. In Germany November 29, 1933

9 Claims. (Cl. 260—39)

The present invention relates to nitrogenous condensation products and a process of producing same.

I have found that valuable nitrogenous condensation products are obtained by causing condensing agents of the Friedel-Crafts type (for example AlCl₃, AlBr₃, FeCl₃, SbCl₃, BF₃, ZnCl₂ or ZnBr₂) to act on dicarboxylic acid imides of the general formula:

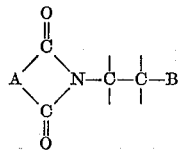

in which A is an aromatic radicle and B an aromatic radicle containing at least one free ortho-position.

The condensation of the said dicarboxylic acid imides is usually carried out at temperatures above 100° C. in the absence or presence of solvents or diluents inert to the condensing agent, such as trichlorbenzene or sodium chloride.

Dicarboxylic acid imides of the said kind are for example beta-phenylethylphthalimide or the imides derived from halogen phthalic acids, alkylphthalic acids, naphthalene-ortho-dicarboxylic acids or naphthalene-peri-dicarboxylic acids. If, for example, beta-phenylethylphthalimide is employed the reaction most probably proceeds according to the following equation:

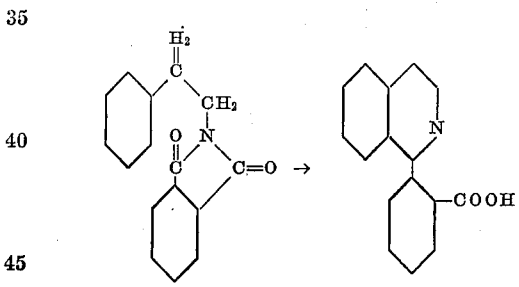

Instead of containing the beta-phenylethyl-amine radicle, the imides may contain radicles of substitution products of beta-phenylethyl-amine, as for example of hydroxyphenylethyl-amines, or radicles of the naphthylethylamines or ortho-amino-diphenyls. When employing dicarboxylic acid imides derived from ortho-amino-diphenyl, the reaction probably takes the following course:

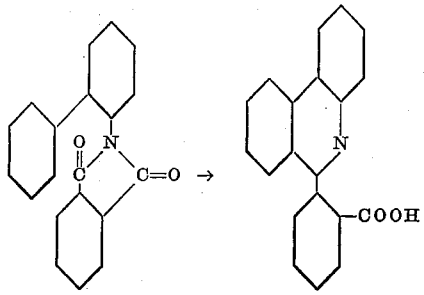

Other dicarboxylic acid imides which are capable by ring closure of forming a pyridine ring may be employed. The free linkages of the carbon atoms of the

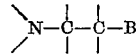

chain may be satisfied by hydrogen or such substituents as permit the formation of a double linkage under the influence of condensing agents as for example

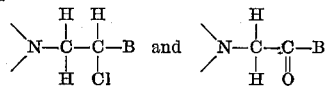

In the case of compounds which contain dicarboxylic acid imide radicles of the said type more than once in the molecule, the ring closure may take place more than once under the influence of the said condensing agents. Thus for example ortho-ortho'-diphthalimidodiphenyl probably reacts according to the following equation:

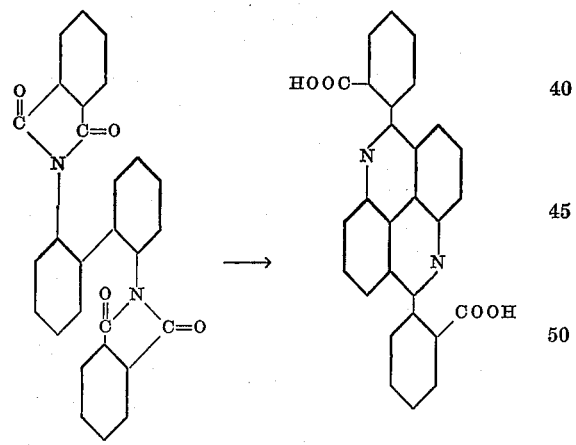

The condensation products may be considered as carboxylic acids of isoquinoline derivatives and are usually colorless, readily crystallizable substances of high melting point which are usually difficultly soluble in organic solvents and usually comparatively readily soluble in alkalies and acids. Their picrates and perchlorates are especially suitable for their characterization.

The following examples will further illustrate how the said invention may be carried out in practice but the invention is not restricted to these examples. The parts are by weight.

*Example 1*

A mixture of 240 parts of sodium chloride and 240 parts of anhydrous aluminium chloride is gradually added while stirring at 140° C. to 240 parts of phenylethylphthalimide corresponding to the formula

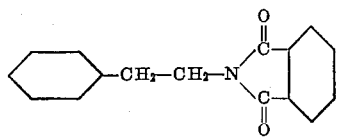

which can be prepared from phthalic anhydride and beta-phenylethylamine. When the whole has been introduced, the temperature is raised to 160° C. and kept constant for about 8 hours. After cooling the orange-red reaction mixture is powdered and introduced into 2000 parts of water while stirring and filtered. The fraction remaining is extracted with 2500 parts of hot 5 per cent hydrochloric acid. The filtrate and the extract are united and diluted to 9000 parts by the addition of water. The whole is heated to boiling, the aluminium being precipitated in the form of its hydroxide at the boiling temperature by the addition of 1200 parts of concentrated ammonia. The whole is filtered while hot, the precipitate washed well and the filtrate strongly concentrated whereby free alpha-phenylisoquinoline-ortho'-carboxylic acid crystallizes out. It forms pure white glistening crystals having a melting point of from 285° to 287° C., is insoluble in water, is difficultly soluble in acetic acid and readily soluble in mineral acids, caustic alkalies, ammonia and sodium carbonate solution. The readily crystallizing alkali metal salts may be readily separated from the aqueous alkaline solution by the addition of alkali metal hydroxide or common salt. Aqueous picric acid precipitates from the dilute acetic acid solution a yellow picrate having a melting point of 186° C.

Instead of starting from phenylethylphthalimide, phthalic anhydride and phenylethylamine may be heated at 180° C. until no more water escapes, a mixture of sodium chloride and aluminium chloride then being introduced at 140° C. and worked up as described above.

*Example 2*

A mixture of 170 parts of ortho-aminodiphenyl and 150 parts of phthalic anhydride is heated at 165° C. until no more water escapes. A mixture of 240 parts of sodium chloride and 240 parts of anhydrous aluminium chloride is then introduced while stirring at the same temperature, the introduction being effected a little at a time. When the whole has been introduced, the temperature is raised to 180° C. and kept constant for 7 hours. After cooling, the melt is pulverized and introduced into 1200 parts of concentrated hydrochloric acid. As soon as the red coloration of the solution has completely disappeared it is diluted with 1500 parts of warm water, filtered by suction, washed until neutral and dried. By dissolution in caustic soda solution and precipitation with acetic acid, analytically pure white crystals having a melting point of from 266° to 267° C. are obtained which are insoluble in water, readily soluble in alkalies and difficultly soluble in mineral acids. An acid sulphate crystallizes out from the solution in hot dilute sulphuric acid upon cooling. The solutions in dilute acids have a blue fluorescence. The compound obtained is probably alpha - phenylphenanthridine - ortho'-carboxylic acid having the formula:

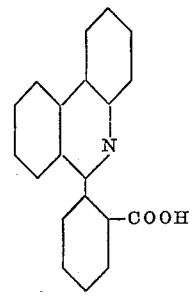

*Example 3*

A mixture of 10 parts of ortho-ortho'-diphthalimido-diphenyl (prepared from ortho-ortho'-diaminodiphenyl and phthalic anhydride), 100 parts of trichlorbenzene and 12.5 parts of anhydrous aluminium chloride is heated at 200° C. while stirring for 6 hours, the melt thus becoming dark red in color. When the reaction is completed, water at ordinary temperature is added and the trichlorbenzene is removed by distillation with steam. The whole is filtered by suction while hot and the brownish yellow residue is washed with hot water. It is fairly pure. For the purpose of complete purification it is dissolved in hot dilute caustic soda solution, filtered if necessary and precipitated while hot with dilute acetic acid. The condensation product which most probably has the formula

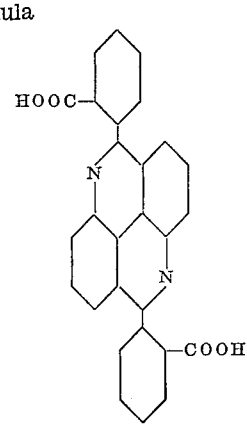

forms almost colorless crystals which do not yet melt at 350° C. It dissolves in concentrated sulphuric acid giving a pale orange-yellow coloration with a violet fluorescence.

*Example 4*

A mixture of 180 parts of 4-chlorphthalic anhydride and 120 parts of beta-phenylethylamine is heated at 150° to 160° C., until water no longer escapes. Into the thus obtained melt of beta-phenylethyl-4-chlorphthalimide (melting point from 112° to 114° C.), there are introduced 240 parts of a mixture of aluminium chloride and sodium chloride (ratio 6 to 1) the temperature being kept for 3 hours at 160° C. The melt is then introduced into 3000 parts of water and the solution while boiling rendered strongly alkaline by means of ammonia. The aluminium hydroxide thus precepitated is filtered off by suction and the filtrate strongly concentrated. The chlorphenylisoquinoline carboxylic acid deposited is filtered off by suction, washed with water and purified, if desired, by dissolving it in sodium hydroxide solution and reprecipitating by the addition of acetic acid. It is a white crystalline powder which melts at 230° C.

*Example 5*

A mixture of 148 parts of phthalic anhydride and 156 parts of beta-(4-chlor)phenylethylamine is heated at about 180° C. until water no longer escapes. The imide thus formed melts at between 140° and 142° C. Into the melt, 240 parts of a mixture of aluminium chloride and sodium chloride (ratio 6 to 1) is introduced at 180° C. while stirring. After further heating for 2 hours at the said temperature, the reaction mass is worked up in the manner described in Example 1. The resulting compound is 1-phenyl-7-chlor-isoquinoline-2'-carboxylic acid which melts at between 242° and 243° C. under decomposition.

What I claim is:—

1. A process of producing nitrogenous condensation products which comprises causing condensing agents of the Friedel-Crafts type to act at a temperature sufficiently elevated to cause the reaction on imides of ortho-dicarboxylic acids of the benzene series corresponding to the general formula:

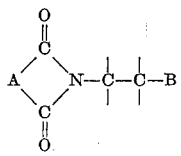

wherein A is a radicle of the benzene series and B a radicle of the benzene series containing at least one free ortho-position, and wherein the free linkages of the carbon atoms of the

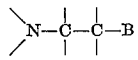

chain may be satisfied by hydrogen or such substituents as permit the formation of a double linkage under the influence of condensing agents.

2. A process of producing nitrogenous condensation products which comprises causing anhydrous aluminium halides to act at a temperature sufficiently elevated to cause the reaction on imides of ortho-dicarboxylic acids of the benzene series corresponding to the general formula:

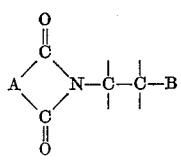

wherein A is a radicle of the benzene series and B a radicle of the benzene series containing at least one free ortho-position, and wherein the free linkages of the carbon atoms of the

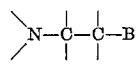

chain may be satisfied by hydrogen or such substituents as permit the formation of a double linkage under the influence of condensing agents.

3. A process of producing nitrogenous condensation products which comprises causing condensing agents of the Friedel-Crafts-type to act at a temperature sufficiently elevated to cause the reaction on imides of ortho-dicarboxylic acids of the benezene series corresponding to the general formula:

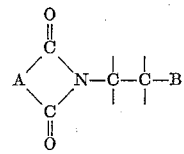

wherein A is a radicle of the benzene series and B a radicle of the benzene series containing at least one free ortho-position, and wherein the free linkages of the carbon atoms of the

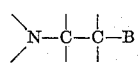

chain may be satisfied by hydrogen or such substituents as permit the formation of a double linkage under the influence of condensing agents, in the presence of a diluent inert to the said condensing agent.

4. A process of producing nitrogenous condensation products which comprises causing condensing agents of the Friedel-Crafts type to act at a temperature sufficiently elevated to cause the reaction on imides of ortho-dicarboxylic acids of the benzene series corresponding to the general formula:

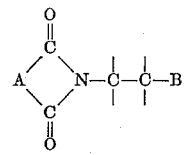

wherein A is a radicle of the benzene series and B a radicle of the benzene series containing at least one free ortho-position, and wherein the free linkages of the carbon atoms of the

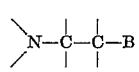

chain may be satisfied by hydrogen or such constituents as permit the formation of a double linkage under the influence of condensing agents, in the presence of sodium chloride.

5. A process of producing nitrogenous condensation products which comprises causing condensing agents of the Friedel-Crafts type to act at a temperature sufficiently elevated to cause the reaction on imides of ortho-dicarboxylic acids of the benzene series corresponding to the general formula:

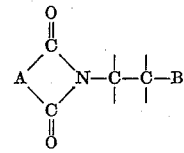

wherein A is a radicle of the benzene series and B a radicle of the benzene series containing at least one free ortho-position, and wherein the free linkages of the carbon atoms of the

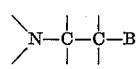

chain may be satisfied by hydrogen or such substituents as permit the formation of a double linkage under the influence of condensing agents, in the presence of trichlorbenzene.

6. Nitrogenous condensation products corresponding to the formula:

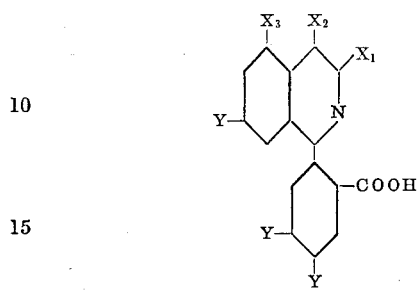

in which Y stands for a monovalent atom selected from the group consisting of hydrogen and chlorine and in which the positions $X_1$, $X_2$ and $X_3$ are satisfied by a substituent selected from the group consisting of hydrogen, the grouping

attached to the positions marked $X_1$ and $X_2$, $X_3$ being hydrogen, and the grouping

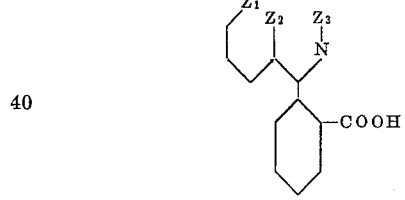

$Z_1$ being combined with $X_1$, $Z_2$ with $X_2$, and $Z_3$ with $X_3$.

7. The nitrogenous condensation product corresponding to the formula:

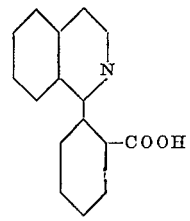

8. The nitrogenous condensation product corresponding to the formula:

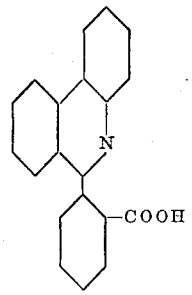

9. The nitrogenous condensation product corresponding to the formula:

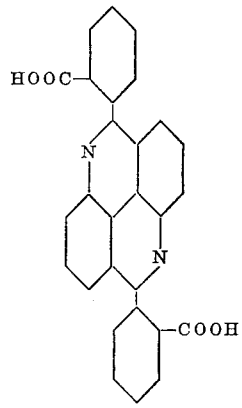

FRIEDRICH EBEL.